US011964500B1

(12) United States Patent
Forouhari et al.

(10) Patent No.: US 11,964,500 B1
(45) Date of Patent: Apr. 23, 2024

(54) TILE PRINTING KIOSK

(71) Applicant: SUSA TILE INC., Richmond Hill (CA)

(72) Inventors: Mohammad Kazem Forouhari, Yazd (IR); Siamak Khosravi Kamrani, Tehran (IR); Mohammad Javad Mohammadnejad Shirazi, Shiraz (IR); Reza Golkar, Tehran (IR); Mojtaba Falahatinezhad, Maple (CA)

( * ) Notice: Subject to any disclaimer, the term of this patent is extended or adjusted under 35 U.S.C. 154(b) by 0 days.

(21) Appl. No.: 18/100,675

(22) Filed: Jan. 24, 2023

(51) Int. Cl.
*B41J 29/02* (2006.01)

(52) U.S. Cl.
CPC .................................... *B41J 29/02* (2013.01)

(58) Field of Classification Search
CPC ........................................................ B41J 29/02
See application file for complete search history.

(56) References Cited

U.S. PATENT DOCUMENTS 6,285,648 B1 * 9/2001 Philipps ............... G11B 17/225

OTHER PUBLICATIONS

Zhang, Chun-liang; A Robot For Printing Glue On Brick Surface; Aug. 16, 2022; China, All (Year: 2022).*

Bernard, Andreas; Sheet Fed Press; Jul. 3, 2020; China, All (Year: 2020).*

Guo, Hong-Jiang; An Automatic Pressure Testing And Packing Device, Aug. 9, 2019, China, All (Year: 2019).*

Watanabe, Shingo, Image Processing Apparatus, Image Processing Method and Printing Device, Oct. 22, 2012, Japan, All (Year: 2012).*

* cited by examiner

*Primary Examiner* — Justin Seo
*Assistant Examiner* — Tracey M McMillon
(74) *Attorney, Agent, or Firm* — Nasser Ashgriz; UIPatent Inc.

(57) ABSTRACT

The present invention is a tile and mosaic printing kiosk that creates custom-designed, sanitary, green, and environmentally friendly tiles and mosaics. The tile printer kiosk is a modular system made up of multiple modules, including feeding, alignment, printing, coating, drying, registering, and packaging. The kiosk is made to fit into any retail home improvement business because of its modest footprint. It can quickly print any design submitted by a customer on tiles and mosaics. Additionally, it applies an antibacterial coating to the tiles for cleaner and better indoor air quality.

12 Claims, 10 Drawing Sheets

TILE PRINTING KIOSK

FIELD OF THE INVENTION

The present invention relates to tile and mosaic products in general and specifically to tile and mosaic printing kiosks that create eco-friendly, hygienic, ecologically friendly, and custom-designed tiles and mosaics.

BACKGROUND OF THE INVENTION

The building industry for residential and commercial structures has lagged behind other industries in terms of innovation. Even as of the end of 2019, the building materials used in residential and commercial structures have not undergone enough innovation. Significant advancements have been made in tile printing and antimicrobial coating, although these advancements have not yet been widely adopted. Customers are compelled to select from a relatively small selection of available tiles and coating possibilities.

The existing process of printing on a tile takes a long time, and it costs much more to print than the tiles that are commonly available. Additionally, no tile printing business offers an antibacterial finish.

Currently, finding a designer to design the tile, locating a printer to print the design on the tile, and purchasing and applying an antimicrobial coating separately are required in order to cover a wall or any other surface with custom designed tiles. This multi-step method could be expensive, take a long time to finish, and produce an unsatisfactory result.

Potential clients are turned off by the extremely restricted design options for the green tiles that are readily available. Only on special order and at a very high cost from specific specialist tile manufacturers are custom created tiles available.

There is a big demand for environmentally friendly materials because environmental awareness is growing so quickly. All industries are now experiencing this demand, including for building supplies like tiles. This industry hasn't responded quickly, though. The demand for eco-friendly building materials has been expanding quickly. According to the USGBC, over 500 American businesses, many of them Fortune 500 firms, are engaged in the creation of green building materials as well as the design and construction of green structures. Even though the US tile market was worth $2.64 billion in 2018, just 2% to 5% of it came from green tiles. The main reason for this is that there aren't as many different green tile designs as there are for regular designs. The majority of the green tile patterns now on the market use simple base colors.

On the other hand, poor IAQ (Indoor air quality) imposes large costs on the economy in terms of illness and lost productivity. One important factor for indoor air quality is to prevent bacterial formation on surfaces. Preventing microbial growth and contamination is a critical step towards a healthier environment. Most microbes settle on solid surfaces, like tiles, and subsequently grow and accumulate forming biofilms, which can lead to larger and potentially more harmful microbial colonies. The damage from these microbes could range from discoloration or bad odor to corrosion. Biofilms can also attract more dangerous microbes that can cause serious infections and diseases.

The existing antimicrobial techniques do not provide continuous protection for the surface, because antimicrobial tile and tile coatings require three ingredients: an active ingredient, a carrier for that active ingredient, and a mechanism to release the active ingredient from the carrier. When the active ingredient adds during the manufacturing process, the chance of the active ingredient be in the surface to interact with microbe and germs are very low.

Since ceramic tiles are usually used in wet or humid areas, and areas requiring high levels of sanitation, such as bathrooms and kitchens, it is important to keep their surfaces germ free. These types of areas have all the criteria needed for growing microscopic gardens of fungi and bacteria because of high moisture and increased surface contamination from food and human contact. Active antimicrobial surfaces can provide continuous antimicrobial efficacy throughout the day to help inhibit the spread of bacteria and other microbes.

Although antimicrobial tile products are new to the industry, with the growing concern about general health and hygiene, the use of such products is expected to rapidly grow. Tiles contribute to good air quality and create healthy and hygienic surfaces. Therefore, their antimicrobial quality is a feature to consider when choosing floor and wall coverings and a benefit that ceramic tiles can provide.

Therefore, there is a need for a new technology to produce custom designed tiles with antimicrobial coating which is more environmentally friendly and can be used in all types of buildings.

SUMMARY OF THE INVENTION

The present invention is a tile and mosaic printing kiosk that creates custom-designed, sanitary, green, and environmentally friendly tiles and mosaics. This kiosk is made to fit into any retail home improvement business and has a compact footprint. It can quickly print any design submitted by a customer on tiles and mosaics. Additionally, it applies an antibacterial coating to the tiles for cleaner and better indoor air quality.

The tile printer kiosk is a modular system made up of multiple modules, including feeding, alignment, printing, coating, drying, registering, and packaging.

The present invention is a tile printing kiosk to produce a green, environmentally friendly, hygienic and custom designed tile having a housing with a plurality of access doors, said tile printing kiosk comprising a feeding module to feed a tile into an alignment zone, said feeding module comprises of a circular tray, wherein said circular tray is filled with a plurality of tiles with various sizes; a motor to rotate the circular tray based on the signal from a sensor; and a first mechanical arm to pick the tile from the circular tray and place the tile on the alignment zone.

The present invention also comprises of an alignment module to position and align comprises of a plurality of linear actuators to push the tile in a proper location and a first conveyer belt to move the tile in a longitudinal direction to a printing zone and a first elevator, a printing module to print a pattern on the tile; and the first elevator to move the tile from the printing zone to a coating zone.

The present invention also comprises of a coating module to apply an antimicrobial coating on the tile comprises of an elongated roller to apply an even coat of an antimicrobial agent on the surface of the tile, said roller is being touched by the antimicrobial agent through a container; a second conveyer belt to move the tile in a longitudinal direction to a second elevator and the second elevator to move the tile from the coating zone to a drying zone.

The present invention also comprises of a dryer module having a UV lamp to dry the tile and a third conveyor belt to move the tile from the dryer zone to a registration zone;

a registration module to print a serial number and a project code on a back of the tile; a packaging module having a second mechanical arm to lift the tile and place it on a box, and a computer unit to manage the operation of the modules and take commands from a user.

The user can input the tile size (width of the tile) into the machine and the machine operates to place the tile in a proper orientation with respect to various nozzles of the printer to print a design, a picture, a pattern or the like on the tile. A conveyer belt moves the tile in the device. The coating module of the device applies an antimicrobial coating on the tile and is being dried. This particular antimicrobial coating (nano-coating) penetrates into the pores of the tile to provide a long lasting and durable coating.

A computer station is used to create a project based on easy-to-use steps by the user interface. The user can bring his/her pictures by a USB or a mobile phone to the computer station.

The tile printing kiosk combines art and technology to provide a user-friendly printer and allows the customers to customize their homes and buildings. The tile printing kiosk of the present invention is designed to transform industrial size and large printing machines into small size printer to be located in any local home retail store. The customers can bring their own design or use the thousands of designs available on the system to print on tiles or mosaic. Artistic designs can be printed on tiles or mosaic to cover walls or build murals.

This tile printing kiosk is easy to use and can print a design on an individual tile or into many tiles. A desired design can be printed on a large number of tiles, each tile having a small section of the whole design.

The tile printing kiosk of the present invention is designed for both residential and commercial buildings, and for customers who wish to have artistic designs on the walls or floors of a building, as well as customers who need specific surface characteristic on the walls or floors or a building. For example, hygienic and designed tiles are of great demand in hospitals, clinics, and doctors' offices. Artistic designed tiles are of interest in shopping malls, sport centers, airports, and many more. The tile printing kiosk can print small to very large designs for a wide variety of applications.

One of the main objects of the present invention is to provide a system to produce custom designed tiles which are environmentally friendly, green, safe and sanitized. The present invention provides custom designed tiles at competitive cost.

It is another object of the present invention that makes it easy for everyone to print their designed tiles at a competitive cost to regular tiles.

It is another object of the present invention to provide a tile printing kiosk which is easy to use, has a small footprint to be place in local home improvement retail stores which can fit in a 1.5 $m^2$ area, and it is a turnkey system.

It is another object of the present invention to provide a tile printing kiosk to produce long lasting antimicrobial coating on the tiles for improved indoor air quality.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
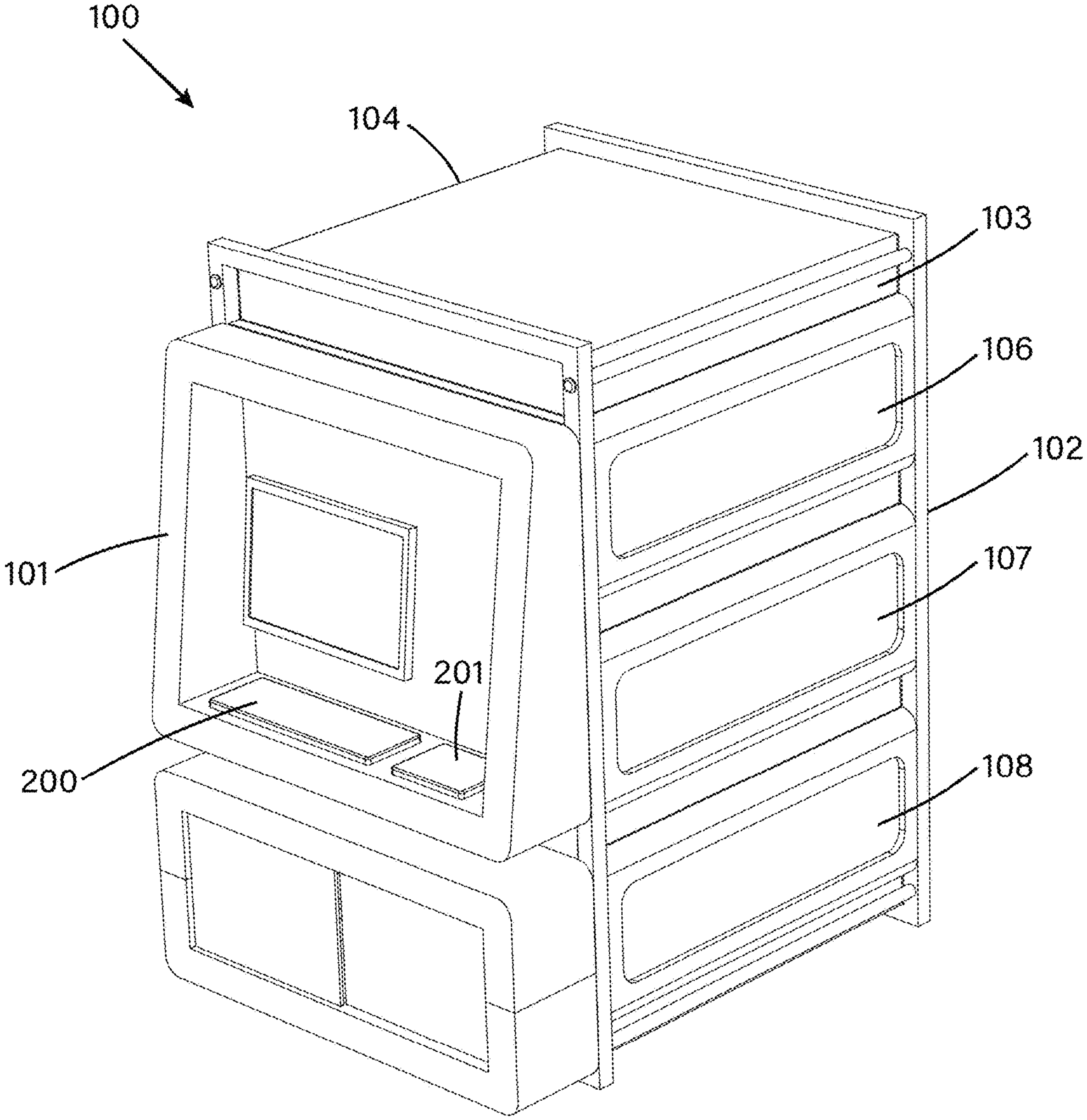
FIG. 1 shows a perspective view of a tile printer kiosk of the present invention.
Figure 2:
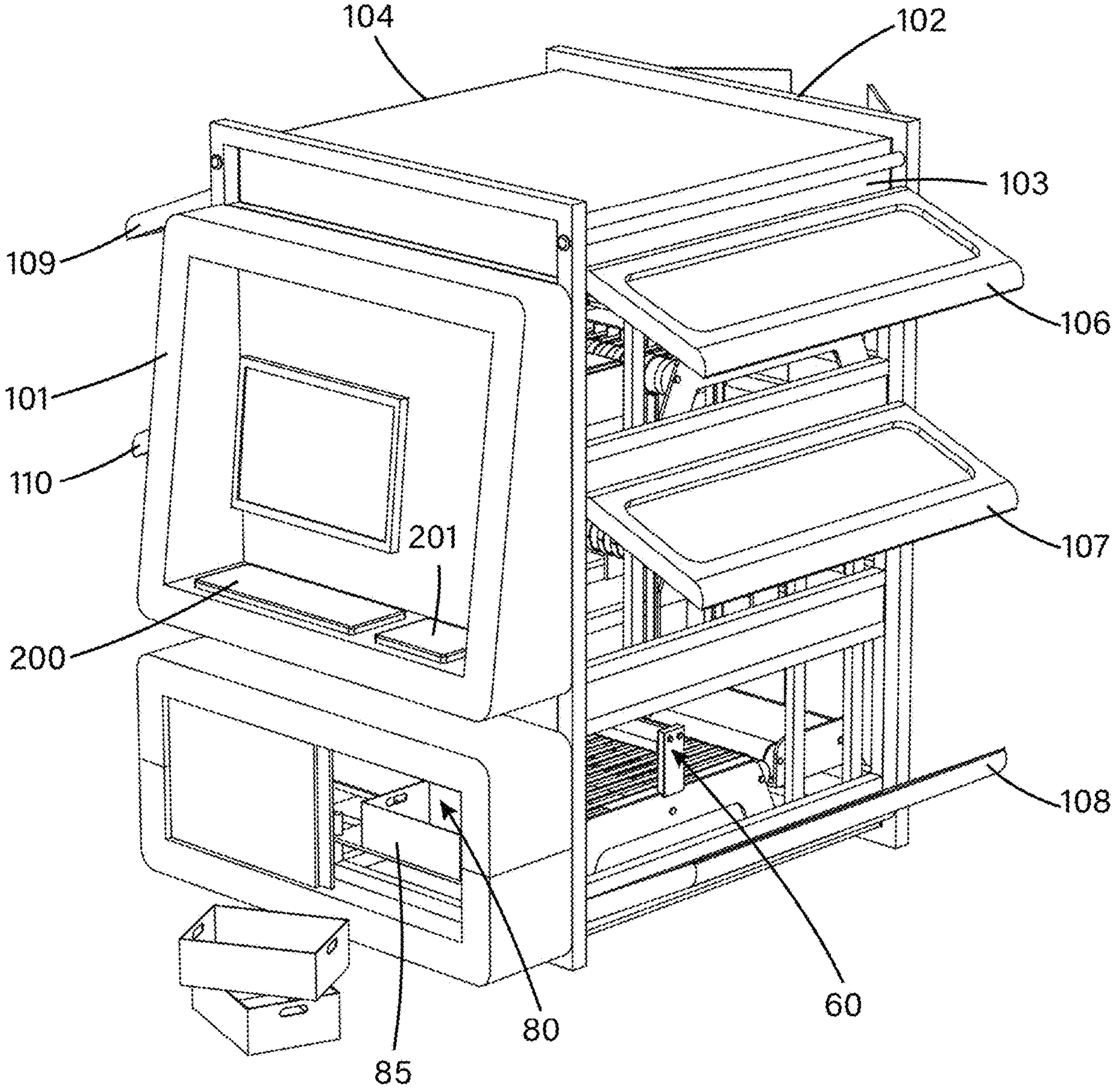
FIG. 2 shows a perspective view of a tile printer kiosk of the present invention when the side doors are open.
Figure 3:
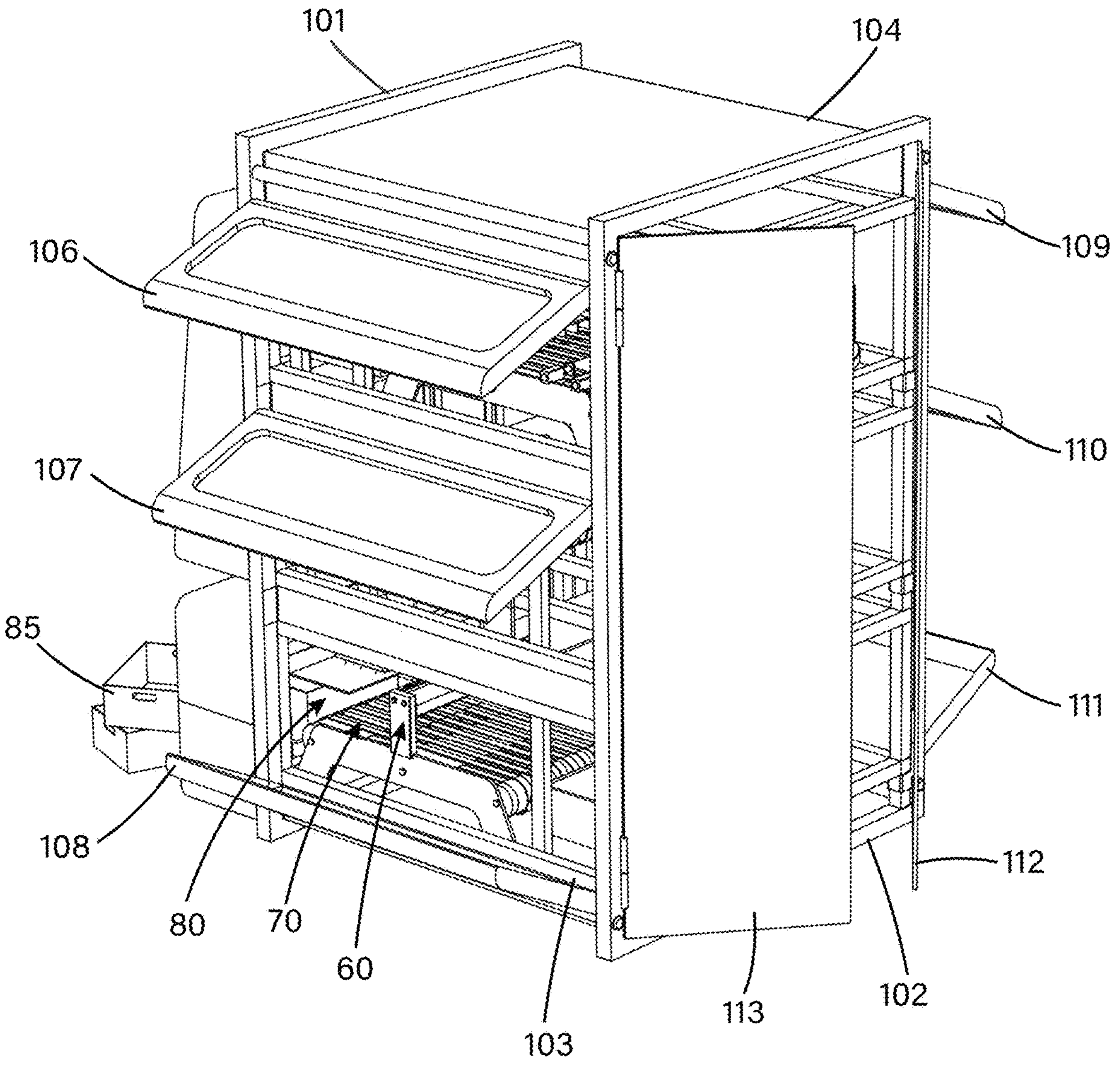
FIG. 3 shows a perspective view of a tile printer kiosk of the present invention from the side.
Figure 4:
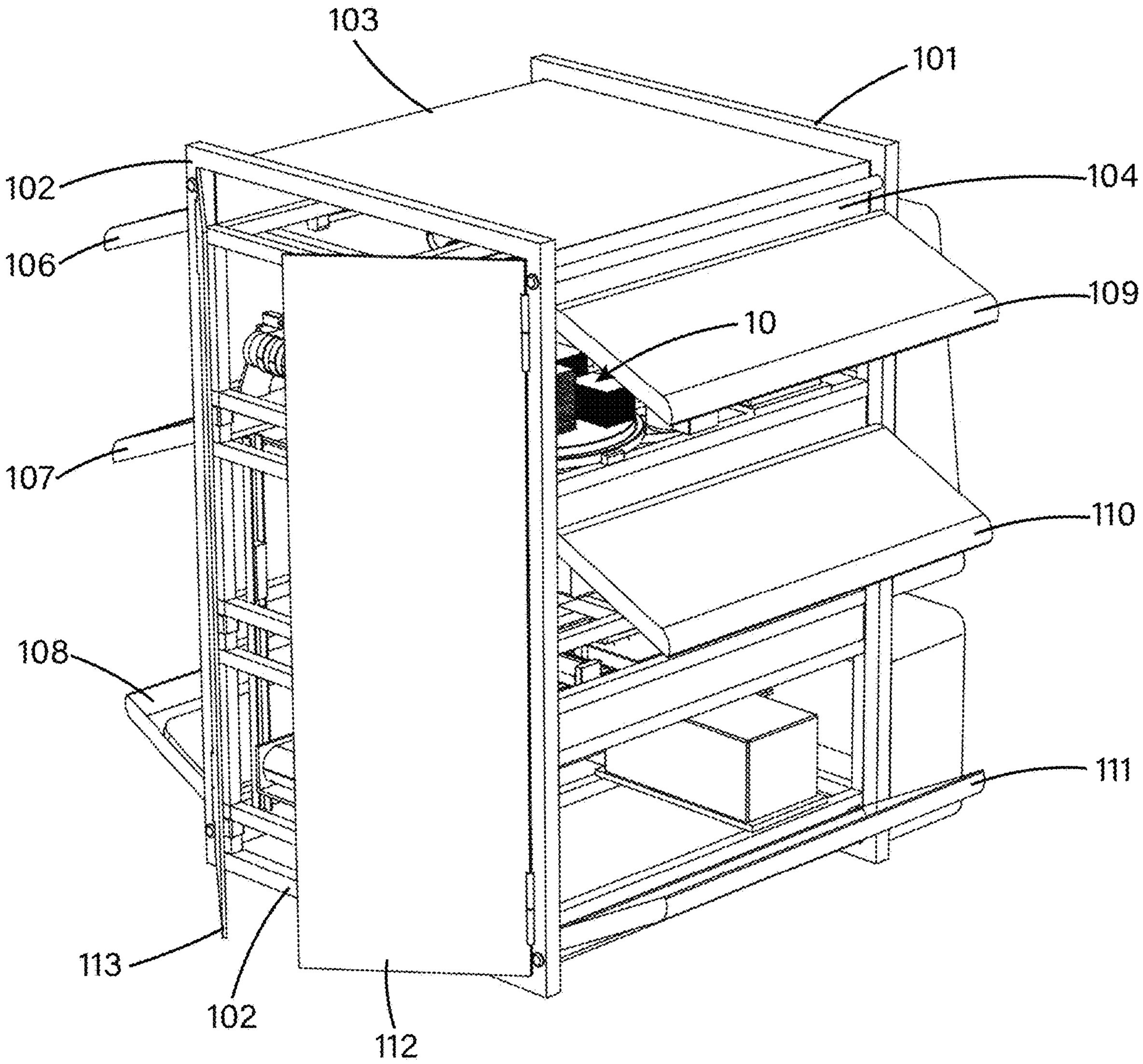
FIG. 4 shows a perspective view of a tile printer kiosk of the present invention from the back side.
Figure 5:
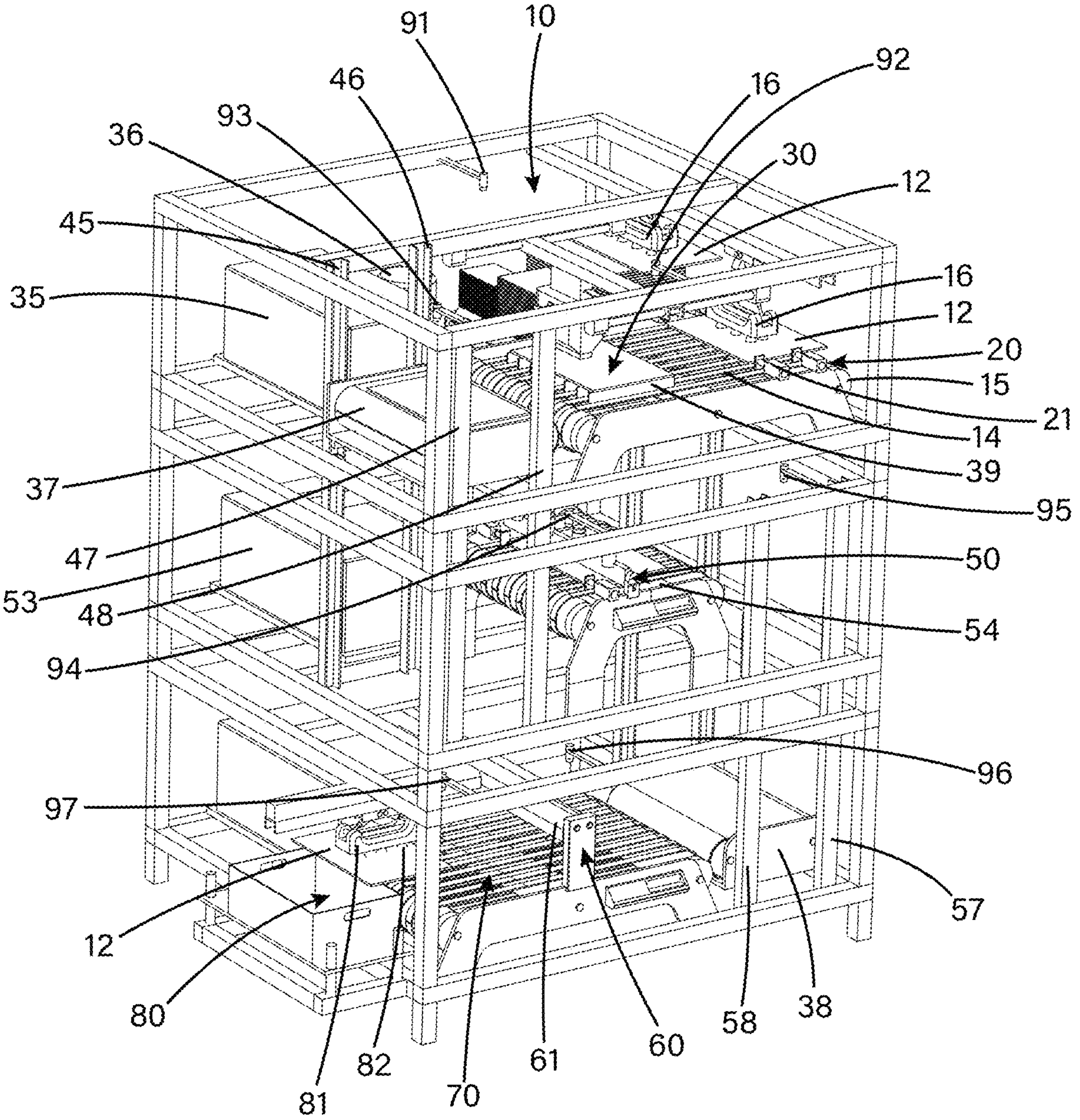
FIG. 5 shows a perspective view of inside of the tile printer kiosk of the present invention.
Figure 6:
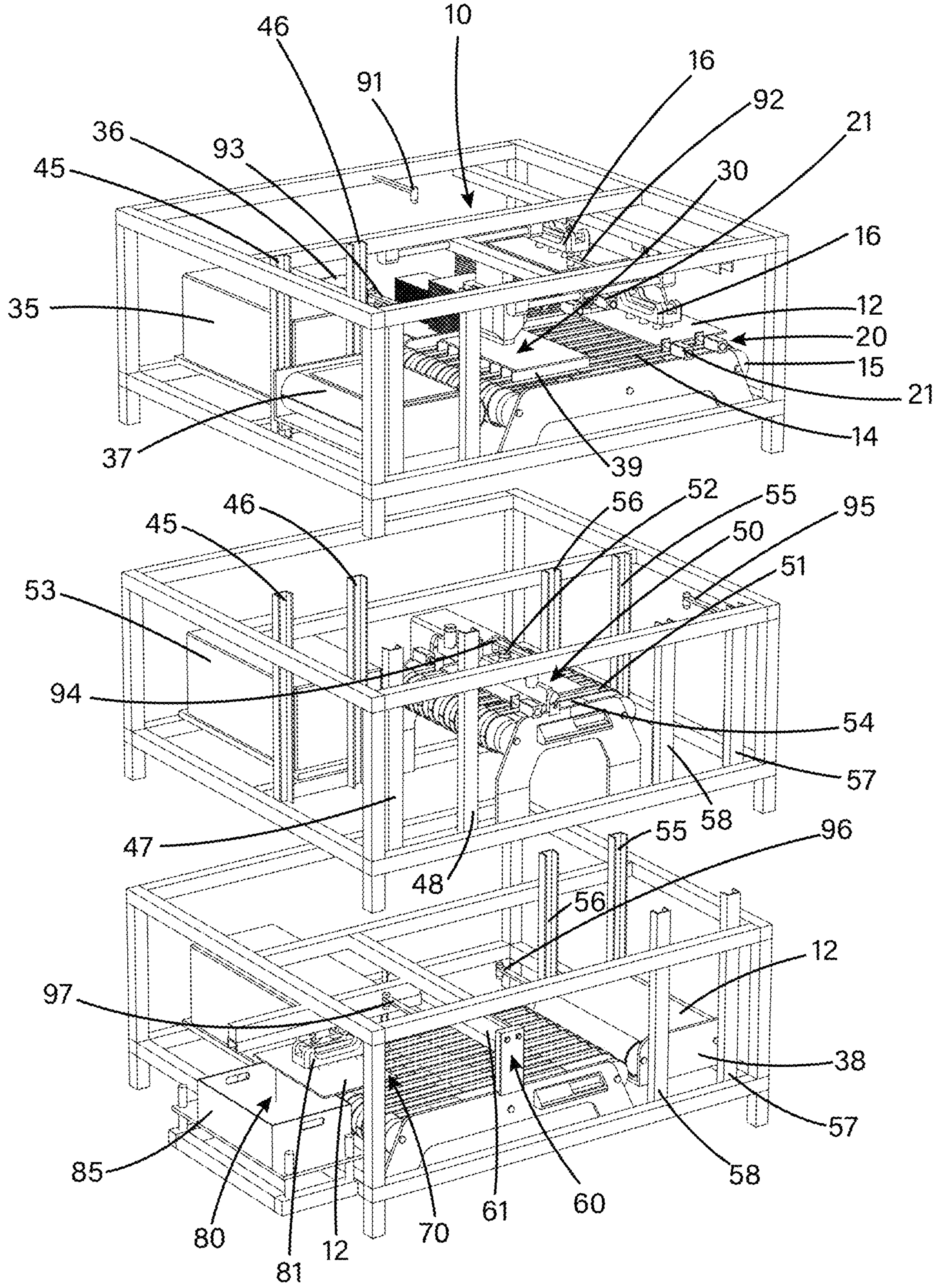
FIG. 6 shows a perspective view of inside of the tile printer kiosk of the present invention in three sections.
Figure 7:
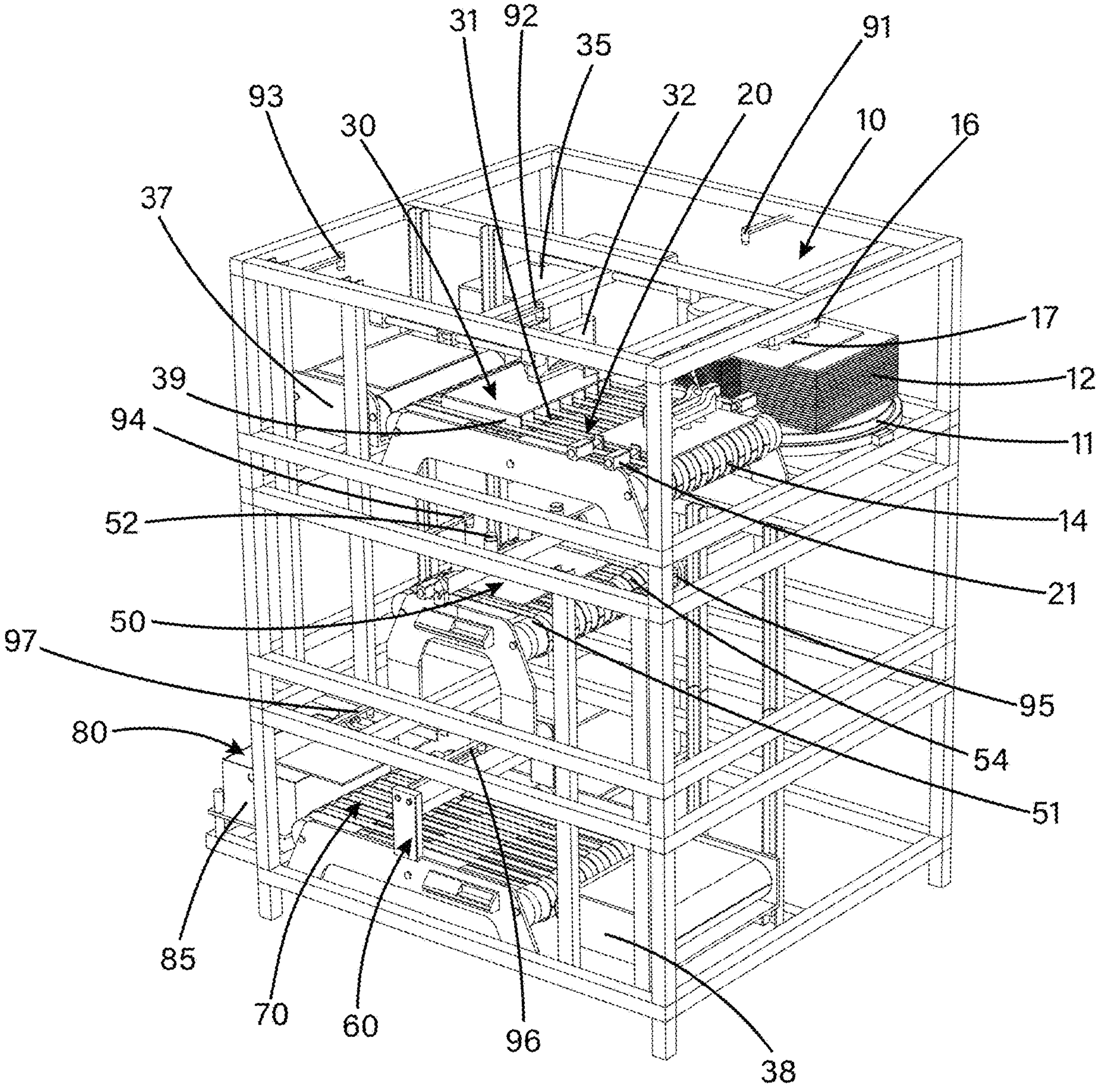
FIG. 7 shows a perspective view of inside of the tile printer kiosk of the present invention.
Figure 8:
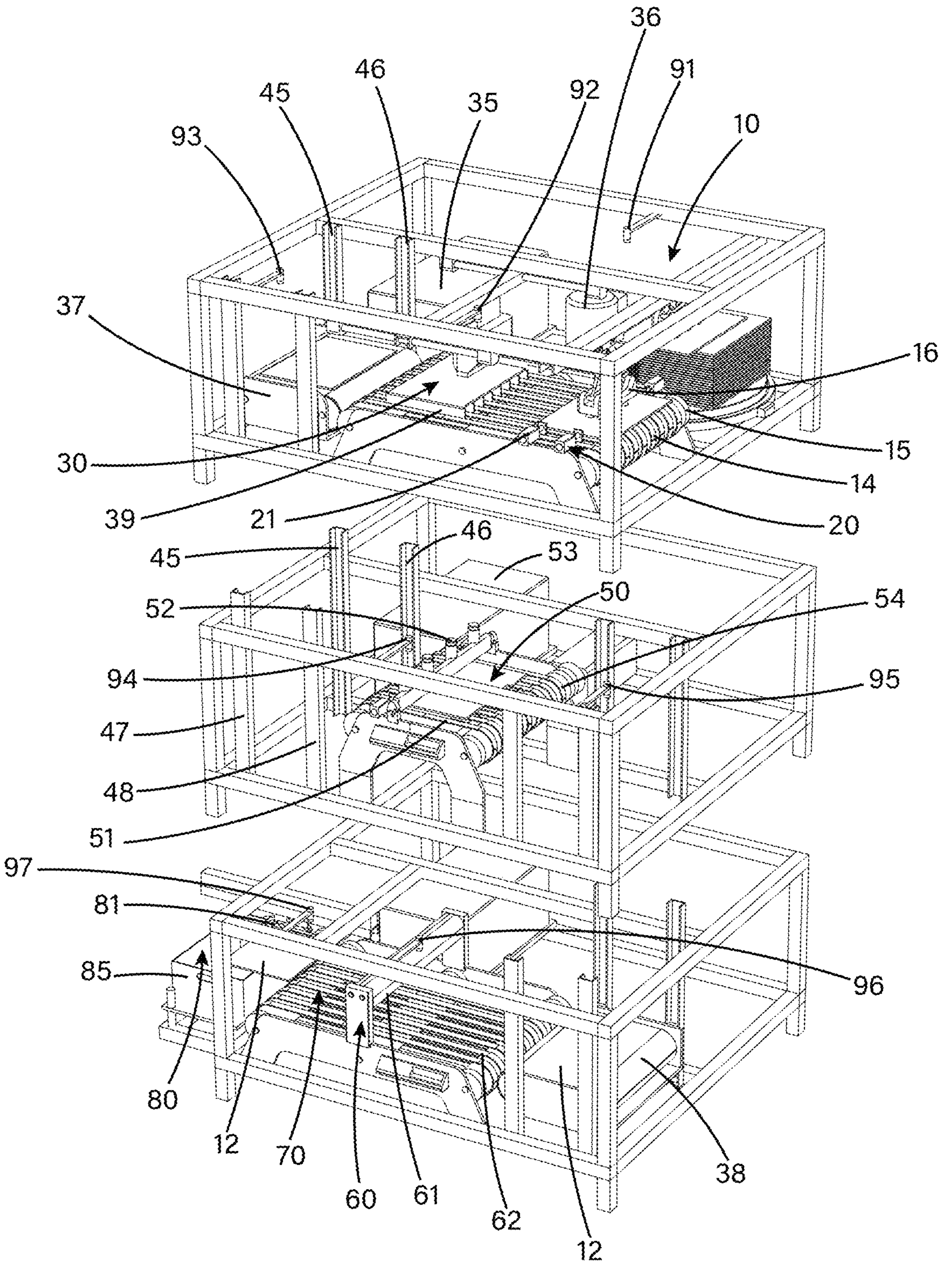
FIG. 8 shows a perspective view of inside of the tile printer kiosk of the present invention in three sections.

As shown in FIGS. 1-6, a tile printing kiosk 100 comprises of a housing with a front wall 101, a rear wall 102 and two side walls 103, 104. The tile printing kiosk 100 have several modules which are design on top of each other to reduce the foot-print of the present invention. The tile printing kiosk 100 comprises of several modules: a feeding module 10, an alignment module 20, a printing module 30, a coating module 50, a dryer module 60, a registration module 70 and a packaging module 80.

As shown in FIGS. 5-8, the feeding module 10 feeds a tile 12 from a tray of tiles 11 into an alignment zone 14. The feeding module 10 is designed to efficiently feed and convey tiles 12 into the alignment zone 14. Once a tray of tiles 11 are placed on the feeding module 10, a mechanical arm 16 lifts one tile 12 from the tray of tiles 11 and places it on the first conveyor belt 15 on the alignment zone 14. The mechanical arm 16 is equipped with suction cups 17 to pick the tiles 12 without damage to the edges.

The feeding module 10 comprises of a circular tray 11, wherein said circular tray 11 is filled with a plurality of tiles 12 with various sizes; a motor 36 to rotate the circular tray 11 based on the signal from a sensor 91; a first mechanical arm 16 to pick the tile 12 from the circular tray 11 and place the tile on the alignment zone 14.

An alignment module 20 as shown in FIGS. 5-8 is provided to make sure that the tile 12 is placed in a proper location in the alignment zone 14. Once the user inputs the tile size (width of the tile) into the tile printing kiosk 100, the alignment module 20 operates to place the tile 12 in a proper orientation with respect to the nozzles of the printer. The alignment module 20 comprises of a plurality of linear actuators 21 to push and align the tile 12 in a proper location.

The linear actuator 21 in the present invention is selected from a group consisting of a hydraulic actuator, a pneumatic actuator, and an electro-mechanical actuator.

The alignment module 20 to position and align the tile comprises of a plurality of linear actuators 21 to push the tile 12 in a proper location; and a first conveyer belt 15 to move the tile 12 in a longitudinal direction to a printing zone 31 and a first elevator 37.

When the tile 12 is aligned in the alignment zone 14, the first conveyor belt 15 moves the tile to the printing zone 31 under the printer nozzles 32. FIGS. 5-8 show the printing module 30 of the tile printing kiosk 100 to print a design, a picture, a pattern or the like on the tile 12. The printer nozzles 32 move in three directions (x-y-z). The z axis movement is for printer head to move close to the tile 12, and the x-y axis movements are for printing on the surface of the tile 12. A cartridge storage 35 is provided for maintaining the color for ink jet printer.

The printing module 30 further has an elevated plane 39 to move the tile 12 up and down to be placed in a right position based on a printer nozzle 32.

After the printing process is finished, the first conveyor belt 15 moves the tile 12 to the first elevator 37. The first elevator 37 moves the tile 12 from the third section to the second section in the tile printing kiosk 100. When the first elevator 37 is aligned with the coating module 50, the tile 12 is moved to the coating zone 51. The coating module 50 applies an antimicrobial coating on the tile 12. An elongated roller 52 applies an even layer of coating film on the tile 12. An elongated roller 52 is used rather than a spray applicator to provide an even coating for better durability. The antimicrobial coating in this process on the printed tile does not affect the color of the tiles after the coating process.

Figure 9:
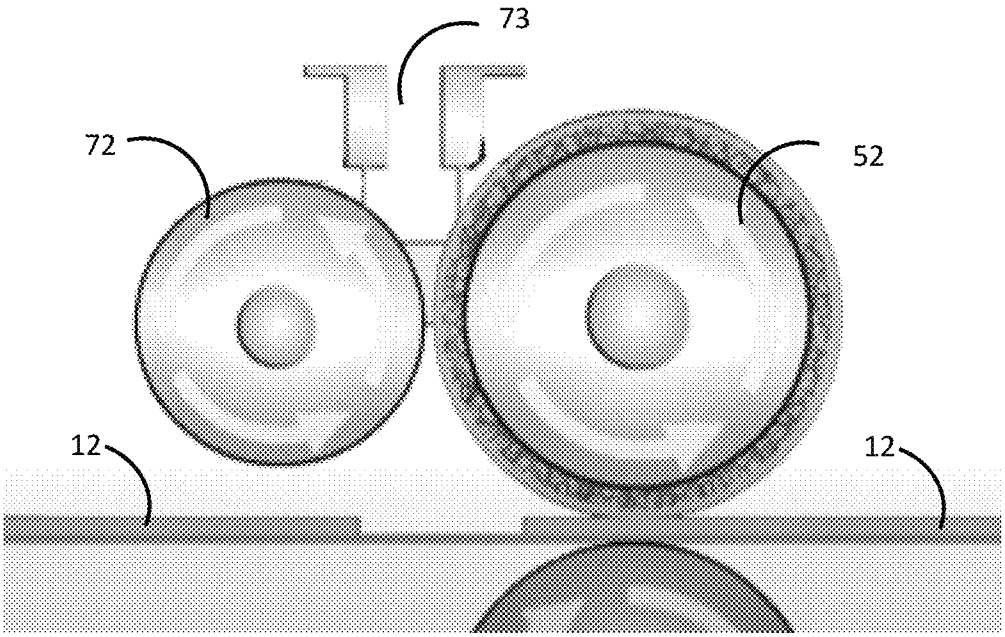
FIG. 9 shows a schematic view of the coating module of the present invention.

The coating module 50 to apply an antimicrobial coating on the tile 12 comprises of an elongated roller 52 to apply an even coating film of an antimicrobial agent on the surface of the tile 12, said roller 52 is being touched by the antimicrobial agent through a container 53. The coating agent stores on the container 53 and transfers to a nip 73 as shown in FIG. 9. Again as shown in FIG. 9, an elongated roller 52 works conjunction with a metering roller 72.

Again, according to FIGS. 5-8, the tile printing kiosk 100 has a dryer module 60 in the first section to dry the antimicrobial coating by a UV lamp 61. After the tile 12 is coated by the antimicrobial coatings, it is moved to the second elevator 38 by the second conveyor belt 53. The second elevator 38 moves the tile 12 from the second section to the first section. The first elevator 37 moves the tile 12 from the third section to the second section.

The first elevator 37 has four railings 45-48 to navigate the tile 12 from the third section to the second section. The second elevator 38 has four railings 55-58 to navigate the tile 12 from the second section to the first section.

The first elevator 37 and the second elevator 38 also have a conveyer belt that can worked in two opposite directions. The conveyer of the first elevator 37 moves a tile 12 forward and backward in two opposite directions. The conveyer of the second elevator 38 moves a tile 12 forward and backward in two opposite directions.

When the tile 12 is being dried by the dryer module 60, the third conveyer belt 62 directs the tile to the registration module 70. Antimicrobial tile coating provides an efficient defense against microbes.

As shown in FIGS. 5-8, the registration module 70 applies a serial number at the back of the tile 12 and the tiles 12 will be directed to the packaging module 80 by a second mechanical arm 81 and several suction cups 82 to pick up the tile 12 and pack the tile 12 into a box 85.

The tile printing kiosk 100 has a power module to drive the conveyer belts based on a computer command for alignment, printing, coating and drying modules. A controller controls the movement of the conveyer belt, feeding module, alignment module, printing module, coating module, dryer module, registration module and packaging module.

The tile printing kiosk 100 includes a computer station 200 to create a project based on easy-to-use steps. The computer station 200 has a touchscreen interface 201 which is positioned at a convenient height for standing person. The user can bring his/her pictures by a USB or a mobile phone to the computer station 200.

Figure 10:
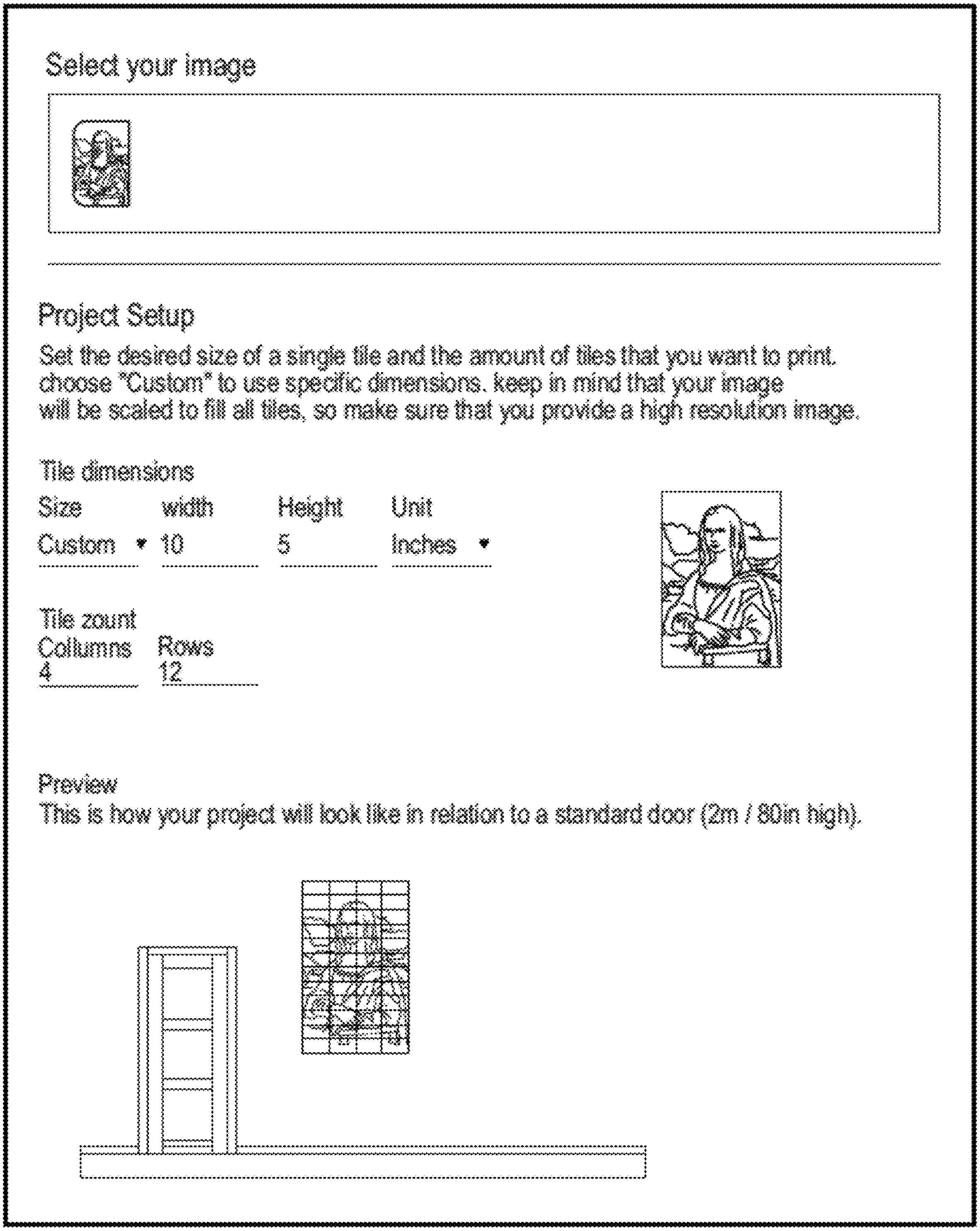
FIG. 10 shows the steps of using the tile printer kiosk to print customized tile.

The tile printing kiosk 100 of the present invention is a user-friendly tile printer. As shown in FIG. 10, a customer can input his/her own design into the machine or choose one of the many designs available on the machine. The customer will also input the size of the design to be printed, for instance, the size of a wall or a floor, and the size of each tile. The machine will then subdivide the design into a number of rows and columns of tiles to fit the given wall or the floor and shows the subdivided image on the screen for customer approval. Customer can make changes at this time, for example, by shifting the design side to side or up and down to center certain aspects of the design, or by choosing and magnifying certain parts of a design. Once the design is approved, the machine will print the design on tiles and number them according to their row and column for easy installation.

The tile printing kiosk 100 is designed to print as small as (2 inches×2 inches) tile to (24 inches×24 inches) tile. Therefore, the tiles can be used in a wide variety of places, residential (new project or renovation project), offices, education centers (universities, colleges), transportation (airport, subway and bus stations), restaurants, retail stores, malls, libraries, but they are more attractive for locations where sanitation is important, such as hospitals, health care facilities, sport centers, swimming pools, clean rooms and commercial kitchens.

As shown in FIGS. 5-8, there are several sensors 91-97 designed in each section to monitor the presence and the position of a tile 12 in the specific zone. For example, different size of tile can be placed on the tile tray 11 and the sensor 91 can identified the size of the tile based on the user preference and place the selected tiles in front of the first mechanical arm 16 to be picked and placed in the alignment section 20. The sensor 93 is used to sense the existence of the tile in the first elevator 37 to be moved to the second section.

The sensor 91-97 in the tile printing kiosk 100 is selected from a group consisting of a proximity sensor, a capacitive sensor and a laser sensor.

As shown in FIGS. 1-4, there are several access doors 106-111 designed in the tile printing kiosk 100 to access to the first section, second section and third section. These doors 106-111 are used for maintenance and repair the tile printing kiosk 100.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A tile printing kiosk with a small footprint to print a custom design on a plurality of plain tiles to create a plurality of custom designed printed tiles, comprising:

a) an upright frame comprising of a top level, a middle level and a bottom level, said upright frame has a front wall;
b) a feeding module and a printing module placed in the top level;
c) a coating module placed in the middle modulo level;
d) a drying module placed in the bottom level;
e) a first elevator to transfer the tile from the top level to the middle level;
f) a second elevator to transfer the tile from the middle level to the bottom level;
g) a computer unit configured to command said modules and to
  i) receive a design, a size of the design, and a tile size,
  ii) breakdown the design into a set of individual tile designs based on the size of the design and the tile size, and
  iii) assign a reference number to each of the individual tile designs to ease assembly after the print,
h) said printing module has an elevated plane to move the tile up and down to be placed in a proximity of a printer nozzle;
i) said feeding module comprising:
  a) a tray, wherein the plurality of plain tiles is placed on a top surface of the tray;
  b) a first mechanical arm to pick one plain tile at a time from the plurality of plain tiles on the tray and place it on a first horizontal conveyer, and
  c) the first horizontal conveyer to receive the plain tile from the tray and move the plain tile to the printing module.

2. The tile printing kiosk of claim 1, wherein the feeding module further having an alignment module to align the plain tile for printing.

3. The tile printing kiosk of claim 2, wherein the alignment module comprising of a plurality of linear actuators to push the tile in a proper location.

4. The tile printing kiosk of claim 3, wherein a linear actuator is selected from a group consisting of a hydraulic actuator, a pneumatic actuator, and an electro-mechanical actuator.

5. The tile printing kiosk of claim 1, wherein the coating module comprises of an elongated roller to carries the coating film conjunction with a metering roller to apply a coating film on each of the printed tiles.

6. The tile printing kiosk of claim 5, wherein the coating film is an antimicrobial agent.

7. The tile printing kiosk of claim 1, wherein the drying module comprising a UV lamp to dry the tile.

8. The tile printing kiosk of claim 1, further having a registration module to print a reference number and a project code on a back of the tile.

9. The tile printing kiosk of claim 1, further having a packaging module having a second mechanical arm to lift the tile and place it on a box.

10. The tile printing kiosk of claim 1, wherein said tile printing kiosk further have a plurality of sensors for each said modules to check the presence of the tile in the top level, the middle level and the bottom level and the movement of the tile in the top level, the middle level and the bottom level.

11. The tile printing kiosk of claim 10, wherein a sensor is selected from a group consisting of a proximity sensor, a capacitive sensor and a laser sensor.

12. The tile printing kiosk of claim 1, wherein the computer unit is placed on the front wall of the tile printing kiosk.

* * * * *